United States Patent
Fioravanti et al.

(10) Patent No.: US 6,819,517 B2
(45) Date of Patent: Nov. 16, 2004

(54) DISC DRIVE SERVO TRACK WRITER GAS LEAK DETECTOR AND METHOD

(75) Inventors: Louis John Fioravanti, Boulder, CO (US); John Jay Freeman, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 324 days.

(21) Appl. No.: 10/151,771

(22) Filed: May 20, 2002

(65) Prior Publication Data

US 2003/0026033 A1 Feb. 6, 2003

Related U.S. Application Data

(63) Continuation-in-part of application No. 10/071,011, filed on Feb. 7, 2002.
(60) Provisional application No. 60/308,985, filed on Jul. 31, 2001.

(51) Int. Cl.[7] ................................................. G11B 21/02
(52) U.S. Cl. ............................. 360/75; 360/31; 360/53; 360/97.02
(58) Field of Search ............................... 360/31, 53, 69, 360/73.03, 75, 77.08, 97.02, 78.14; 324/210, 212, 226

(56) References Cited

U.S. PATENT DOCUMENTS

| | | | |
|---|---|---|---|
| 4,514,672 A | 4/1985 | O'Gwynn | |
| 4,980,783 A | 12/1990 | Moir et al. | |
| 5,774,294 A | 6/1998 | Fioravanti | |
| 5,798,459 A | 8/1998 | Ohba et al. | |
| 6,018,437 A | 1/2000 | Weichelt et al. | |
| 6,084,738 A | 7/2000 | Duffy | |
| 6,144,178 A | 11/2000 | Hirano et al. | |
| 6,147,831 A | 11/2000 | Kennedy et al. | |
| 6,167,749 B1 | 1/2001 | Yanagisawa et al. | |
| 6,178,059 B1 | 1/2001 | Frees | |

*Primary Examiner*—David Hudspeth
*Assistant Examiner*—Jason Olson
(74) *Attorney, Agent, or Firm*—Fellers, Snider, et al.

(57) ABSTRACT

A method of detecting a leak of low-density gas from an enclosure containing a rotating storage disc includes monitoring a signal which varies in response to variations in the concentration of the low-density gas in the enclosure. Additional quantities of the low-density gas are added to the enclosure when the monitored signal indicates that the concentration has dropped below a predetermined level. Monitoring the concentration of the low-density gas may include monitoring actual concentration levels of the gas using a pressure sensor located within the enclosure or monitoring disc mode vibration amplitudes using an accelerometer attached to the enclosure. Indirect monitoring of the vibration amplitudes may also be accomplished using sensors such as a laser Doppler vibrometer, a capacitance probe or the servo head position feedback circuitry found within a disc drive or a dedicated servo track writer.

20 Claims, 7 Drawing Sheets

DISC DRIVE SERVO TRACK WRITER GAS LEAK DETECTOR AND METHOD

RELATED APPLICATION

This application is a continuation-in-part of U.S. patent application Ser. No. 10/071,011 entitled "Early Leak Detection System For a Disc Drive Containing a Low-Density Gas," filed Feb. 7, 2002, and naming inventors Frank W. Bernett and Louis J. Fioravanti. This continuation-in-part application also claims priority of United States provisional application Ser. No. 60/308,985, entitled "Method and Apparatus for Detection of Inert Gas Leakage From Enclosures," filed Jul. 31, 2001, and naming inventors Louis J. Fioravanti and John J. Freeman.

FIELD OF THE INVENTION

This application relates generally to disc drive servo track writers, and more particularly to a servo track writer that is filled with a relatively low-density gas during the servo writing process.

BACKGROUND OF THE INVENTION

A disc drive typically includes a base to which various components of the disc drive are mounted. A top cover cooperates with the base to form a housing that defines an internal, sealed environment for the disc drive. The components include a spindle motor, which rotates one or more discs at a constant high speed, and an actuator assembly for writing information to and reading information from circular tracks on the discs. The actuator assembly includes a plurality of actuator arms extending towards the discs, with one or more flexures extending from each of the actuator arms. Mounted at the distal end of each of the flexures is a read/write head, which includes an air bearing slider enabling the head to fly in close proximity above the corresponding surface of the associated disc during operation of the disc drive. When the disc drive is powered down, the heads may be moved to a landing zone at an innermost region of the discs where the air bearing sliders are allowed to land on the disc surface as the discs stop rotating. Alternatively, the actuator assembly may move (unload) the heads beyond the outer circumference of the discs so that the heads are supported away from the disc surface by a load/unload ramp when the drive is powered down.

Disc drives typically include a servo system for controlling the position of the heads during both seeking operations (moving from one track to another) and read/write operations where the head must precisely follow the circular track. One type of servo system is a dedicated servo system where one entire disc surface contains servo information written as dedicated tracks. The remaining disc surfaces within the drive are thus used to store data on dedicated data tracks. Another type of servo system, known as an embedded servo system, provides servo information on each of the disc surfaces embedded between data portions. Well known state estimator circuitry is used to estimate the position of the heads at such timesthat the heads are not located over the embedded servo information.

With both dedicated and embedded servo disc drives, servo information or patterns are typically recorded on the target disc by a servo-track writer assembly ("STW") during the manufacture of the disc drive. One conventional STW records servo patterns on the discs following assembly of the disc drive. In this embodiment, the STW attaches directly to a disc drive and uses the drive's own read/write heads to record the requisite servo patterns to the mounted discs. An alternative method for servo pattern recording utilizes a separate STW apparatus having dedicated servo recording heads for recording the servo patterns onto one or more discs simultaneously prior to the assembly of such discs within a disc drive.

Regardless of whether the servo information is written to the discs prior to assembly within a disc drive (i.e., using a separate STW assembly having a dedicated actuator assembly) or following assembly of a disc stack within a disc drive (i.e., using the actuator assembly of the disc drive), it is crucial to provide a highly accurate positioning system with the STW to ensure accurate placement of the servo information on the discs. Specifically, a STW includes a positioning system for moving the actuator assembly and the attached heads across the disc surfaces during the servo writing procedure. The STW further includes a highly precise position detection system (often times incorporating a laser) for determining the position of the actuator assembly during the servo writing procedure. The position detection system provides correction signals to a motor within the positioning system to correct any errors in the position of the servo heads during operation of the STW.

In a continuing effort to store more data onto existing or smaller-sized discs, the capacity of each disc or platter is increased by increasing the track density (i.e., the number of tracks per inch). Increased track densities require more closely-spaced, narrow tracks and therefore enhanced accuracy in the recording of the servo patterns onto the target disc surface. However, as the track density increases, it becomes increasingly likely that errors will be encountered during the servo writing process. For example, the servo writing head may experience resonance vibrations during operation which alters the position of the head as the servo information is written. Such vibrations can lead to inaccurate servo information being written to the disc surface which, in turn, limits the ability of the disc drive to accurately position the data head over the desired data track during normal track following procedures (i.e., during normal read and write operations).

The resonance vibrations experienced by the head during the servo writing process are typically caused by the high-speed rotation of the discs within the STW. That is, regardless of whether the STW utilizes the disc drive itself or a separate, dedicated apparatus, the rotation of the discs within the STW (at speeds of up to 10,000 revolutions per minute or more) causes a great deal of air turbulence within the STW. This turbulence results from friction between the spinning disc surfaces and the air within the STW and represents a known phenomenon in the disc drive art. The air turbulence within a STW also impacts other components within the STW such as the actuator arms and the heads flying over the discs.

One proposed solution for reducing air turbulence while writing servo information to the discs within a previously assembled disc drive is to partially fill the drive with helium gas during the servo writing process, thereby reducing the overall density of the gas within the disc drive. Specifically, reducing the density of the gas within the STW acts to reduce the frictional forces applied to the spinning discs, thereby reducing the drag-induced vibrations on the discs and the actuator assembly. However, because disc drives are not hermetically sealed during the servo writing process, it is difficult to achieve a desired helium concentrations within the disc drive due to the tendency of the helium gas to escape the confines of the drive during operation of the STW.

Accordingly there is a need for an improved STW that can detect helium leaks and maintain relatively high concentrations of helium or other low-density gases within the STW for the duration of the servo writing process. Furthermore, there is a need for both a helium-filled STW that works with previously assembled disc drives as well as a helium-filled STW that has dedicated servo heads for writing servo information to discs prior to assembly of the discs within a disc drive. The present invention provides a solution to this and other problems, and offers other advantages.

SUMMARY OF THE INVENTION

Against this backdrop the present invention has been developed. In accordance with one embodiment of the present invention, a method detects leaks of a low-density gas from an enclosure containing a rotating storage disc, where the low-density gas reduces drag-induced vibrations generated by the rotating disc. The method includes monitoring a signal which varies in response to variations in the concentration of the low-density gas in the enclosure and adding additional quantities of the low-density gas to the enclosure when the monitored signal indicates that the concentration has dropped below a predetermined level.

Monitoring the concentration of the low-density gas may include monitoring actual concentration levels of the gas using a pressure sensor located within the enclosure, or may include directly monitoring disc mode vibration amplitudes using an accelerometer. Alternatively, a sensor may be used to indirectly measure the amplitudes of the drag-induced vibrations. Such a sensor may include a laser Doppler vibrometer, a capacitance probe, or the servo head position feedback circuitry found within a disc drive or a dedicated servo track writer.

Another embodiment of the present invention is a servo writing assembly that includes a STW having a base for supporting a spindle motor that rotates the disc and a servo writing head that writes servo patterns on the rotating disc. A cover attached to the base forms an enclosed interior environment within the STW and includes a sealable opening for loading the disc within the STW. The cover further includes an inflow port for directing the low-density gas into the interior environment of the STW prior to writing servo patterns on the disc. The assembly further includes a sensor for detecting when a concentration of the gas within the STW drops below a predetermined minimum level so that additional quantities of the gas can be added until the concentration again exceeds the predetermined minimum level. The sensor may be an accelerometer attached either to the spindle motor of a disc drive inserted within a STW or to a dedicated spindle motor of a MDW. Alternatively, the sensor may indirectly measure amplitudes of the vibrations generated by the rotating storage disc. Such a sensor may include a laser Doppler vibrometer, a capacitance probe or the servo head position feedback circuitry found either in a disc drive or in a dedicated servo track writer. The dedicated servo track writer may comprise a MDW having a plurality of servo writing heads and a dedicated spindle motor for supporting a plurality of discs.

The present invention can further be implemented as a servo writing assembly having an enclosure defining an interior volume filled with low-density gas and supporting a rotating storage disc. The servo writing assembly includes means for detecting when a concentration of the low-density gas within the enclosure has dropped below a predetermined minimum level. The detecting means may include means for indirectly detecting the magnitude of drag-induced vibrations that grow in intensity as the low-density gas leaks from the enclosure and is replaced by air.

These and various other features as well as advantages which characterize the present invention will be apparent from a reading of the following detailed description and a review of the associated drawings.

DETAILED DESCRIPTION

Figure 1:
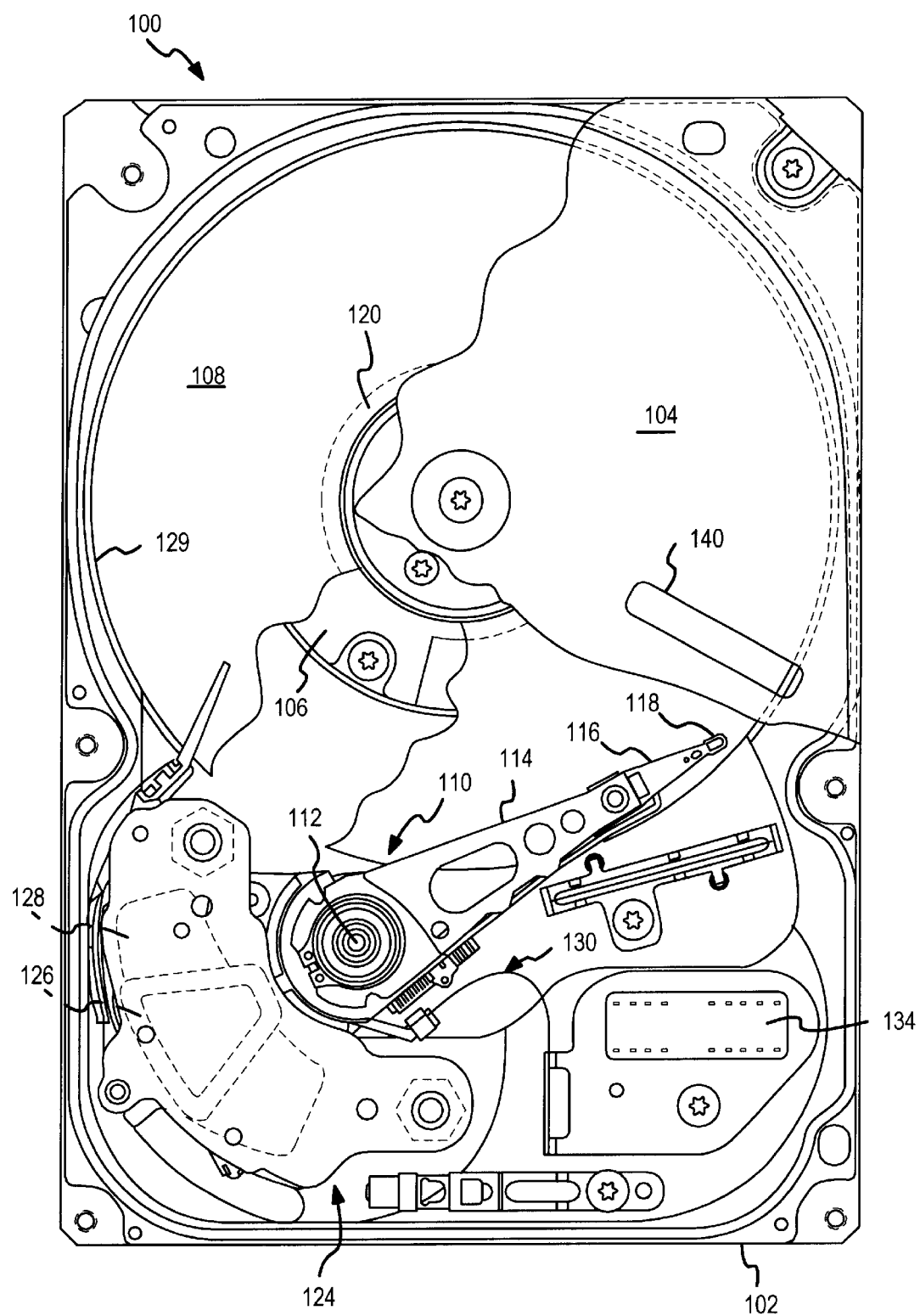
FIG. 1 is a plan view of a disc drive for use in a servo track writer ("STW") incorporating a preferred embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing that defines an internal, sealed environment for the disc drive in a conventional manner. The components include a spindle motor 106, which rotates one or more discs 108 at a constant high speed. Information is written to and read from tracks on the discs 108 through the use of an actuator assembly 110 which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically do-energized when the disc drive 100 is not in use for extended periods of time. The heads 118 are moved over a park zone 120 near the inner diameter of the discs 108 so that the flying heads 118 may land in the park zone 120 when the drive motor is de-energized. The heads 118 are secured over the park zone 120 through the use of an actuator latch arrangement, which prevents inadvertent rotation of the actuator assembly 110 when the heads are parked. Alternatively, the heads 118 may be moved to a ramp (not shown) beyond an outer diameter 129 of the discs 108.

A flex assembly 130 provides the requisite electrical connection paths for the actuator assembly 110 while allowing pivotal movement of the actuator assembly 110 during operation. The flex assembly 130 connects head wires (not shown) to a flex bracket 134 for communication through the base deck 102 to a disc drive printed circuit board (not shown) mounted to the bottom side of the disc drive 100.

The top cover 104 includes an elongated opening 140 extending over the discs 108 in a radial direction as shown in FIG. 1. The opening 140 approximates the arcuate path followed by the heads 118 as they move over the disc surface during operation of the drive 100. The opening allows the STW to detect the position of the heads 118 (such as through the use of a laser) during the servo writing operation. An adhesive sticker (not shown) is used to cover the opening 140 after the conclusion of the servo writing process. Additionally, the opening 140 preferably extends over the outer diameter 129 of the discs 108 to provide access to a separate clock head (not shown) that may be used to write a clock pattern to the outer diameter of the top disc 108. The clock pattern is written at the start of the servo writing procedure and is later read by the clock head (not shown) to provide a timing reference for the servo heads (e.g., the leads 118 of the disc drive 100) as the servo heads write the servo patterns to the discs 108. The procedure for writing a clock pattern to the disc 108 is well known in the art and thus will not be discussed further herein as the details of both the clock writing procedure and the servo writing procedure are not important to the present invention.

Figure 2:
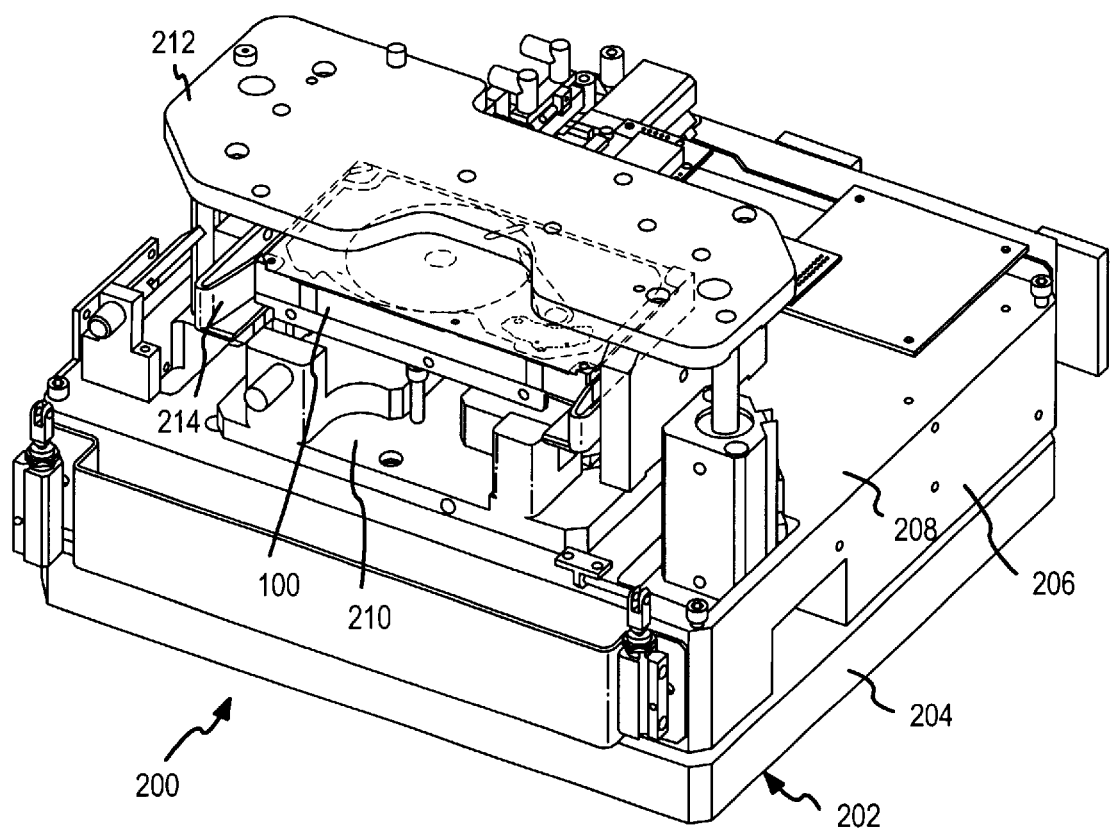
FIG. 2 is a perspective view of a STW in accordance with a preferred embodiment of the present invention incorporating the disc drive shown in FIG. 1.
Figure 3:
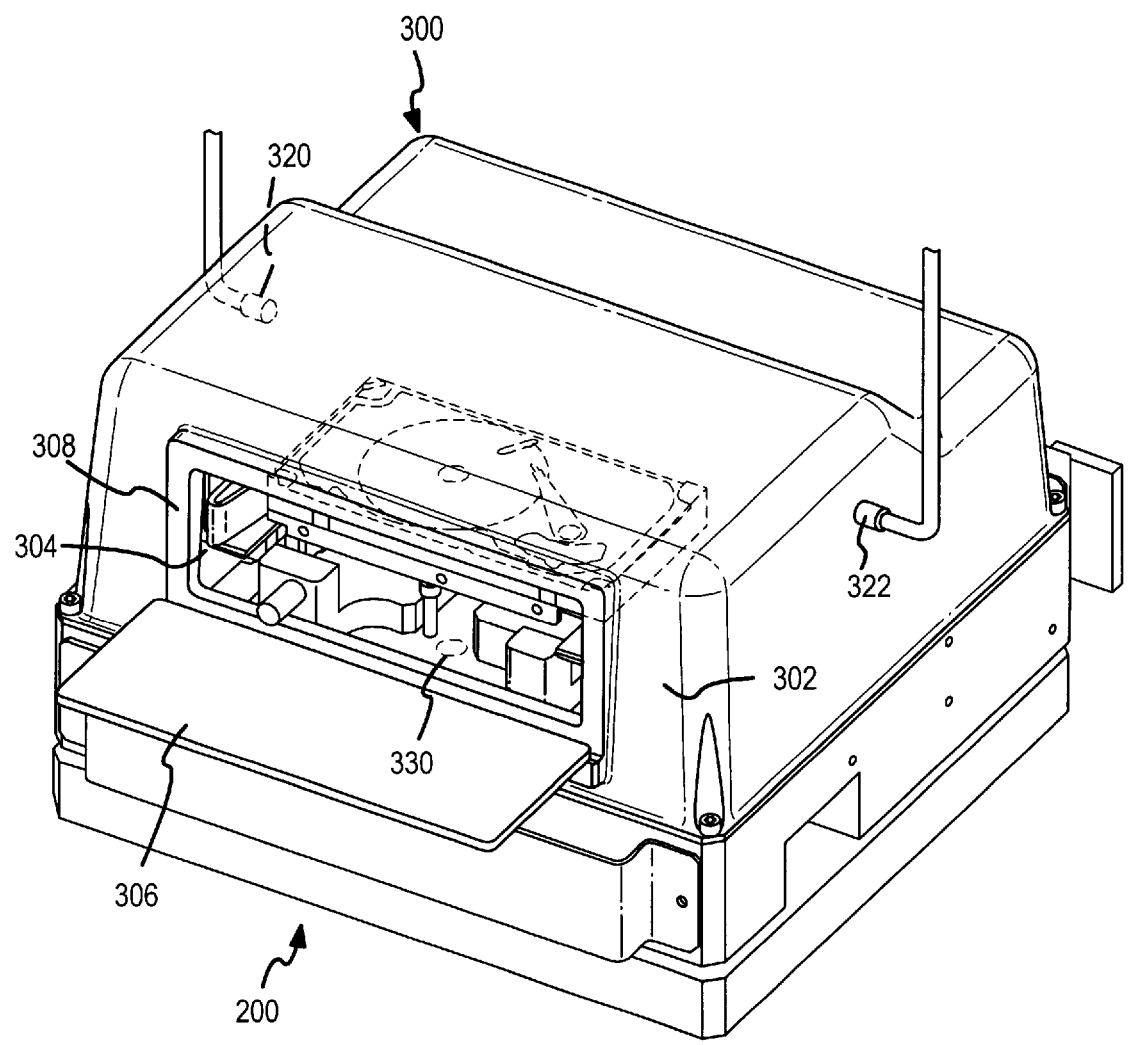
FIG. 3 is a perspective view of the STW of FIG. 2 illustrating a cover for creating a sealed environment within the STW as well as an inflow line for filling the STW with a low-density gas and an outflow line for recovering the low-density gas.

Referring now to FIGS. 2–3, a servo track writer ("STW") 200 is shown where the disc drive 100 has been mounted within the STW 200. The STW 200 shown in FIGS. 2–3 utilizes the actuator assembly 110 and the heads 118 (FIG. 1) of the disc drive 100 to write servo information to one (in the case of a dedicated servo system) or all (in the case of an embedded servo system) of the surfaces of the discs 108. Specifically, during manufacture of the disc drive 100, the drive is loaded within the STW 200 so that an electrical and mechanical connection is formed between the drive 100 and the STW 200. The STW then powers up the disc drive 100 so that the discs 108 are spinning at normal operating speed before writing a clock pattern to the outer perimeter of the top disc 108 as described above using a separate clock head (not shown). The clock pattern is used to synchronize the operation of the STW so that the heads 118 are activated at the proper time to write servo information to the disc surfaces.

The STW next writes a first servo track at one extreme of the discs 108 and then pushes the actuator assembly 110 so that the heads 118 move a predetermined distance across the disc surface to a new track location. Once the STW confirms the position of the heads 118 (both laterally using a position detecting system and circumferentially using the information received from the clock head), the heads 118 are activated to write servo information at the new track location. This process continues until the heads 118 have moved across the entire surface of the discs 108 so that each disc (in the case of embedded servo systems) or a single disc (in the case of dedicated servo systems) contains the required servo patterns. Once the servo information is completely written, the disc drive 100 is removed from the STW 200 and the openings formed in the disc drive 100 (e.g., the opening 140 in the top cover 104) for writing the servo patterns are closed to create a sealed interior within the disc drive 100.

The STW 200 preferably includes a mounting fixture 202 having a granite block 204 and a mounting plate 206 with a calibrated, level top surface 208 that serves as a mechanical reference for the STW 200. A mounting base 210 includes an upper clamp plate 212 and plurality of clips 214 for securing the disc drive 100 within the STW 200. The disc drive 100 is preferably loaded into the STW 200 by robotic means to ensure that the drive 100 is properly seated within the STW 200. It is preferred that the drive 100 be fixed and level within the STW 200 prior to the start of the servo writing process.

A pusher block assembly (not shown) is preferably positioned below the disc drive 100 and includes a pusher pin (not shown) that extends upward through an opening in the disc drive base 102 to move the actuator assembly 110 and thus the heads 118 across the disc surfaces during the servo writing process. A position detecting system 230 (not shown separately in FIG. 2) determines the actual position of the heads 118 using detection means such as a laser interferometer that directs a laser beam through the opening 140 in the top cover 104 of the disc drive 100. The position detecting system provides position correction signals to a controller (not shown) which, in turn, directs the operation of the pusher block assembly (not shown). As the above-described operation of the STW 200 is conventional, no further description of the servo writing process is deemed necessary for the purposes of explaining the present invention.

Previously, the STW 200 shown in FIG. 2 has been left open to allow for easy insertion and removal of the disc drive 100 from the STW 200. Because servo track writing takes place during manufacture of the disc drive 100 in a clean room facility, there was no need to cover or enclose the STW 200. However, FIG. 3 illustrates the STW 200 of FIG. 2 with the addition of a cover 300 fixed to the mounting plate 206 of the STW 200. The cover 300 is preferably sculpted to define the smallest possible interior environment without interfering with the operation of the different STW components. The cover 300 includes a front face 302 defining an opening 304 for receiving the disc drive 100 within the interior environment defined by the STW 200 and the cover 300. A door 306 is preferably hinged along a bottom edge so that the door 306 may be closed to seal the drive 100 within the covered STW 200. In one preferred embodiment, a motor (not shown) cart be used to automatically open and close the door 306 so that the door can be used in conjunction with robotic means for automatically loading and retrieving the drive 100 from the covered STW 200. A seal 308 around the periphery of the opening 304 acts in conjunction with the door 306 to form a substantially sealed internal environment within the covered STW 200 when the door 306 is closed.

The cover 300 allows for recovery of helium (or another low-density gas) that is introduced into the disc drive 100 during the servo writing process. Specifically, while helium gas is preferred, other low-density gases may be used provided that the gas has a lower density than air. In a preferred embodiment, the gas will have a density that is approximately twenty percent that of air. The cover 300 preferably includes an inflow port 320 and an outflow port 322 (FIGS. 3 and 4) for respectively introducing helium into and recovering helium from the interior environment of the STW 200. The single outflow port 322 allows the expended helium to be directed to a helium gas recovery system (not shown) which may be used to separate the helium gas from air. Such a recovery system allows the relatively costly helium gas to be recycled for future servo writing cycles.

Filling the STW 200 with helium or another low-density gas during the servo writing process substantially reduces drag-induced vibrations experienced by the discs 108 the actuator arms 114, the flexures 116 and the heads 118. The reduction in drag and drag-induced vibrations results in a "quieter" servo writing cycle and a more accurate (i.e., circular) servo pattern being written to the discs 108. However, it has been determined that when relatively high concentrations of the low-density gas (e.g. helium) are maintained within the STW 200 significant improvements over servo writing in an air environment (i.e., using the exposed STW 200 shown in FIG. 2) are obtained. Such high concentrations raise a problem in that a typical servo writing cycle may take an hour or longer to complete. Thus, to the extent that the cover 300 and the door 306 do not form a hermetic seal with the mounting plate 206 of the STW 200, the helium gas will tend to leak from the STW during the lengthy servo writing process. If the helium concentration within the STW drops too low (e.g., lower than 95 percent in one embodiment), the drag on the discs 108 and the actuator arms 114 and the turbulence within the drive 100 may increase to an unsatisfactorily high level resulting in errors in the servo patterns written to the discs.

Specifically, it is known that drag-induced vibrations are greater in air than in helium (or other low-density gases). Thus, as the concentration of helium within the STW drops, the amplitudes of certain vibrations within the STW 200 (e.g., the "disc modes" of the discs 108 within the disc drive 100) tend to rise, leading to the above-described servo writing errors. Therefore, the present invention includes means for detecting the magnitude of these vibrations themselves, either directly or indirectly, so that additional helium may be added to the STW200 as necessary over the course of the servo writing cycle.

In a first embodiment, the helium concentration may be determined directly such as by including a pressure sensor 330 (FIG. 3) within the STW200 to provide real-time measurements of helium concentrations. Once the detected helium concentration drops below a predetermined minimum concentration (e.g., 95 percent), a control system (not shown) can be programmed to add additional helium through the inflow port 320 until the sensor 330 detects a sufficiently high helium level. As minimum concentration of approximately 95 percent helium (or an alternative low-density gas) is preferred, although less preferred is a minimum concentration of about 50 percent. While the sensor 330 shown in FIG. 3 is shown below the disc drive 100 it is understood that the position of the sensor may be determined experimentally to provide a representative reading of the helium levels within the drive 100. Alternatively, the sensor 330 may be inserted directly within the drive 100, such as through the opening 140, to provide the most accurate reading of the helium concentration within the drive.

Figure 4:
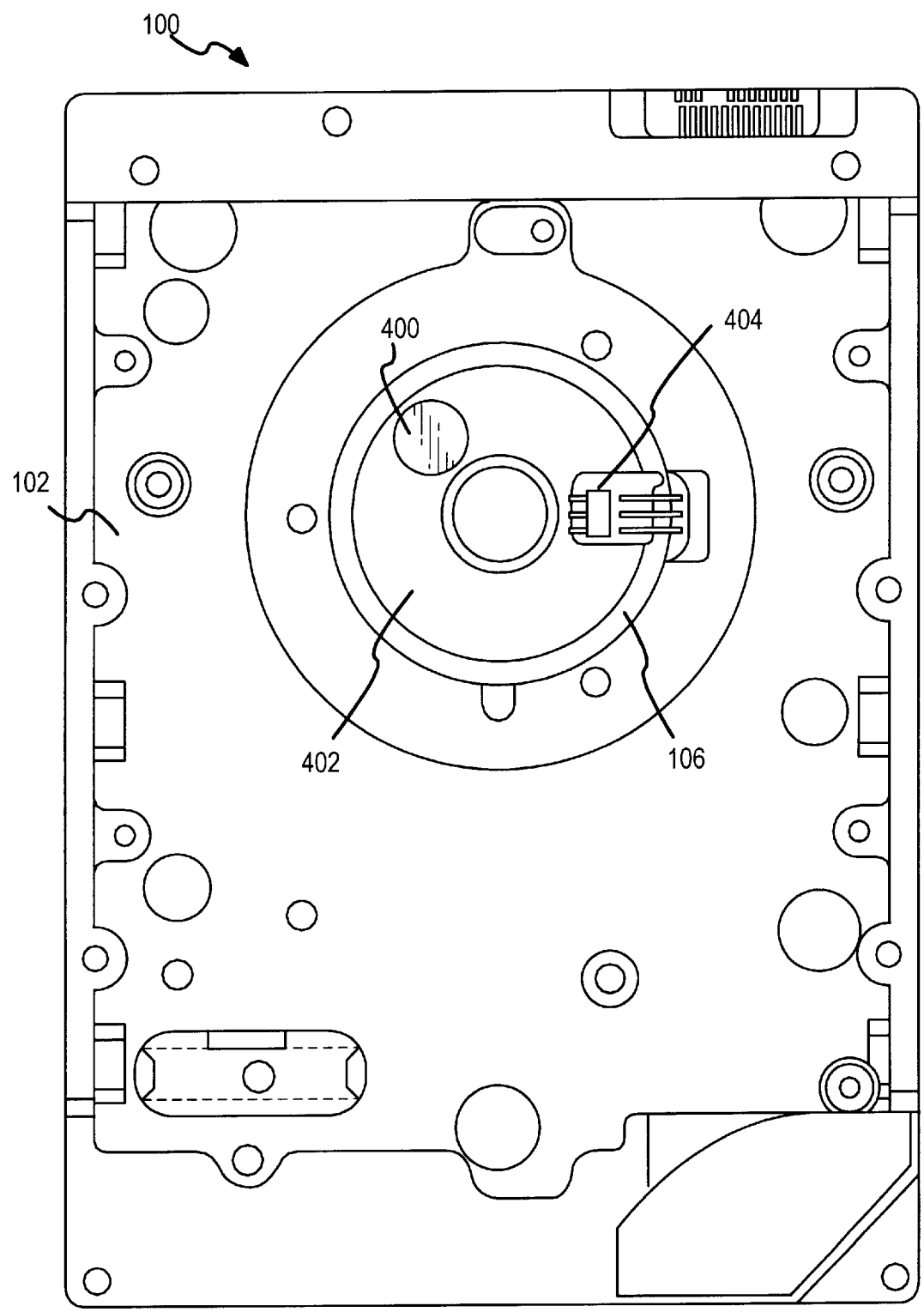
FIG. 4 is a plan view of a bottom side of the disc drive shown in FIG. 1 illustrating an accelerometer positioned on a spindle motor base of the disc drive.

In an alternative embodiment, the helium level may be indirectly determined by measuring the amplitude of the vibrations produced during the servo writing process. For example, an accelerometer 400 (FIG. 4) could be used to measure the amplitude of the known disc modes of a disc drive and compare the measured value to previously determined experimental values for operation in both an air environment and a 100 percent helium environment. A helium leak within the STW 200 could then be detected as air starts to fill the environment within the STW and the vibration levels measured by the accelerometer begin to rise. While the accelerometer 400 could be fixed to the mounting plate 206 of the STW 200 (e.g., in place of the sensor 330 shown in FIG. 3), it is preferred that an accelerometer 400 be attached to a base 402 of the spindle motor 106 of the disc drive 110, as shown in FIG. 4. Specifically, the spindle motor base 402 typically includes a relatively large, flat surface that extends through an opening (not shown) formed in the disc drive base 102. While the spindle motor base 402 typically supports an electrical connector 404 that mates with a similar connector on the disc drive circuit board (not shown), there is sufficient space on the motor base 402 to support the accelerometer 400. The base 402 of the spindle motor 106 will typically vibrate in concert with the discs 108 that are supported on a hub of the spindle motor, and thus provides a good indication of the disc mode amplitudes. While an accelerometer 400 may be fixed to each disc drive 100, a lower-cost solution would be to utilize a detachable accelerometer 400 that can be attached to the spindle motor 106 of each disc drive 100 prior to servo writing the drive 100 in the STW 200.

In addition to the pressure sensor 330 shown in FIG. 3 and the accelerometer 400 shown in FIG. 4, the present invention may utilize other means for indirectly determining fluctuations in drag-induced vibrations to detect and then compensate for helium leaks within the STW 200. For example, the sensor 330 within the STW 200 could be replaced by a laser Doppler vibrometer ("LDV") which detects the magnitude of disc mode vibrations by determining the actual velocity of the disc surface. Alternatively, a capacitance probe could be fixed to the STW 200 to measure displacement of the disc by measuring the change in capacitance of an air gap between the disc and the probe tip. Another method of indirectly determining the vibrations within the drive 100 (and thus the level of helium within the STW 200) is to monitor the position feedback signal generated by the drive 100 itself. This position feedback signal indicates the distance between the actual head path and the ideal head path during the servo writing process and can be used to provide an indirect indication of the amount of vibration and turbulence that is being experienced. Specifically, because there is lower turbulence in a helium-filled STW200, the position error signals generated by the feedback circuit will be lower in a helium environment.

The above-described means for both directly and indirectly measuring vibration (i.e., disc mode amplitudes) are preferably monitored to determine when the level of helium (or other low density gas) falls below a predetermined level. In the case where the sensor 330 measures actual concentration levels, no special processing is required to determine when the helium level is falling below a predetermined level. However, in the case of more indirect measurements of the has level, a further processing step is required to equate these signals to gas levels within the STW 200. For example, while the time-variant signals generated by each of the different sensors described above do not equate directly to helium levels, a fast Fourier transform ("FFT") algorithm may be applied to the sensed signals to determine the relevant amplitudes of the disc mode vibrations. These levels can then be experimentally equated with helium levels within the STW 200. Alternatively, if real-time measurements of the vibration amplitudes using a FFT are not desired, a root mean square ("RMS") value of the signal over time may be determined so that the total energy inherent in the monitored signal is determined. Since the RMS value of the signal will increase as the vibration within the STW 200 increases (i.e., as the helium gas leaks from the STW 200), the RMS value can provide an equally accurate measurement of helium concentrations as that obtained by using a FFT to determine real-time vibration amplitudes. As the above processing techniques are conventional in nature, they will not be described in greater detail. However, the present invention applies these known techniques to signals that indirectly measure the vibrations within a STW 200 so that a concentration of helium (or other low-density gas) within the STW 200 can be determined.

During the course of the servo writing procedure, the control system (not shown) monitors the signal from the sensor 330 or the accelerometer 400 to determine if additional helium (or another low-density gas) is needed to maintain the concentration at desired levels, as described above. Depending on how "airtight" the covered STW 200 is (i.e., depending on the degree to which the cover 300 can prevent air from leaking back into the STW once the desired helium concentration has been obtained), the control system (not shown) may operate continuously to supply a constant flow of helium gas to the STW 200 through the inflow port 320 in order to maintain the desired helium concentration. In this case, the control system may operate to increase the flow rate of helium through the inflow port 320 when it detects a low concentration. For example, if the flow rate through the inflow port 320 is normally 8 standard cubic feet per hour ("SCFH"), the control system may increase the rate to 9 or 10 SCFH for a short period of time until the helium concentration again exceeds the desired minimum level. Alternatively, if the covered STW is sufficiently airtight, the control system (not shown) may shut off the flow of helium gas to the inflow port 320 once the STW is initially filled, only adding more helium gas as necessary to compensate for leaks detected by the sensor 330 or 400. In this manner, the interior of the STW 200 is subjected to the least possible amount of turbulence to provide the "quietest" environment for writing the servo patterns on the disc surfaces since there would be no continuous flow of helium gas within the STW 200 during the servo writing procedure.

Figure 5:
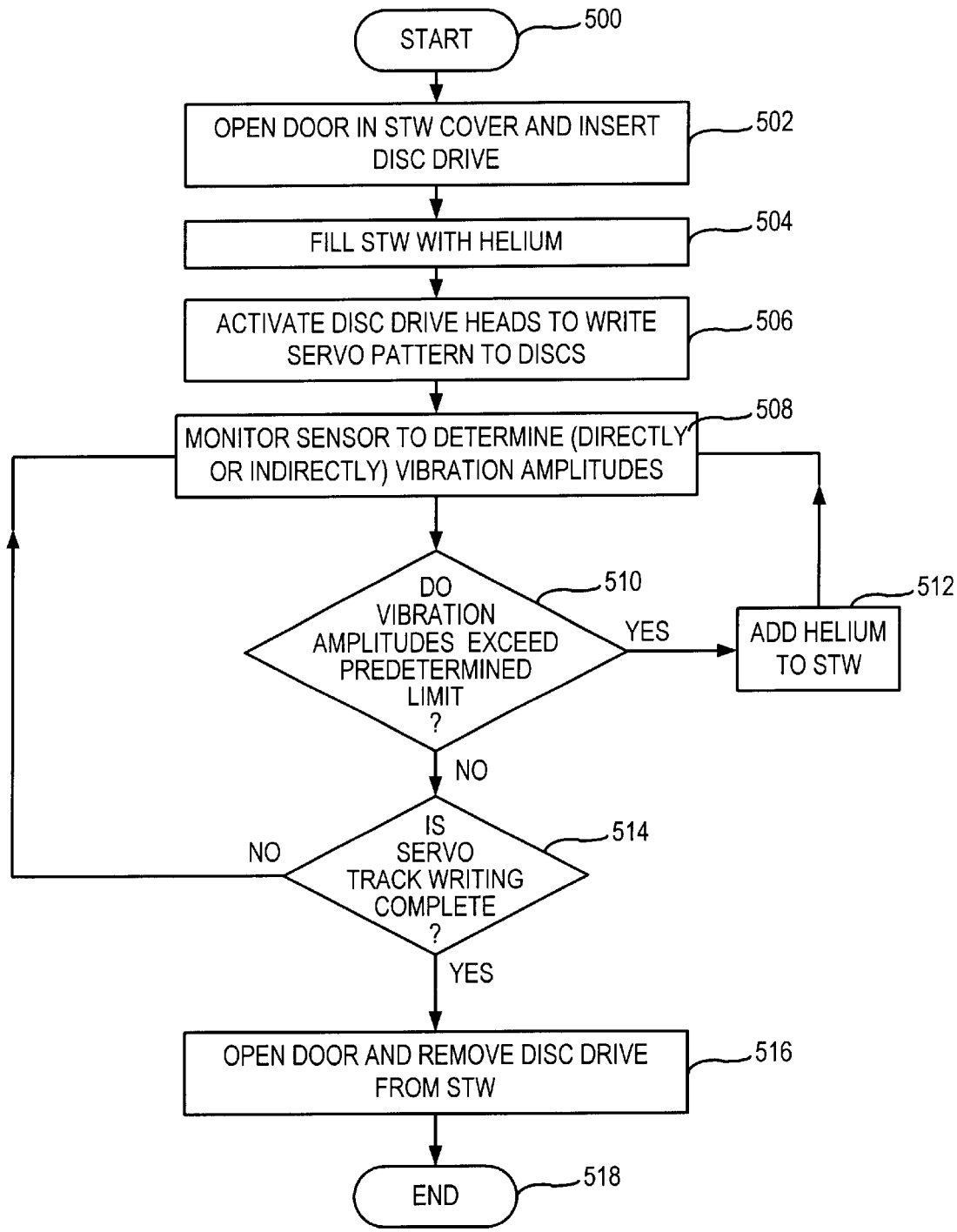
FIG. 5 is a flow chart of a general method of detecting gas leaks while writing servo information on discs using a STW filled with a low-density gas in accordance with a preferred embodiment of the present invention.

Referring now to FIG. 5, a preferred method of writing servo patterns to the discs 108 of an assembled disc drive 100 is disclosed. The method starts at 500 and proceeds to operation 502 where the door 306 of the cover 300 is opened to accept the assembled disc drive 100. Next, in operation 504, the door 306 is closed to seal the STW 200 and the control system (not shown) is activated to direct helium gas through the inflow port 320 to fill the STW 200 to a desired concentration (e.g., at least 95 percent). The helium gas preferably meets the cleanliness requirements for a class 10 clean room (i.e., less than 30 parts-per-million hydrocarbons, particulates less than 0.2 microns, etc). If the sensor 330 represents a pressure sensor, then the sensor 330 may be used to determine when the STW has achieved the initial desired helium concentration. Alternatively, if helium leaks are detected indirectly by measuring vibrations as described above, then it may be preferable to experimentally determine the time required to reach the desired initial concentration level at the prescribed flow rate.

Once the STW is initially filled with helium, the method continues at operation 506 where the disc drive heads 118 are activated to write servo patterns to the discs 108. The ability to write the servo patterns in a helium environment reduces the types of above-described errors that tend to occur when the servo writing process occurs in an air environment, thereby permitting the disc tracks to be written at a higher density.

In the next step 508, the sensor 330 or 400 is monitored to determine an amplitude of the vibrations produced by the rotating discs (disc modes). Alternatively, in the case where the sensor 330 comprises a pressure sensor, the sensor 330 may be monitored to determine a real-time measurement of the helium concentration. A determination is then made at step 510 as to whether the vibration amplitudes measured in step 508 exceed a predetermined maximum value. Alternatively, in the case of a pressure sensor 330, the step 510 would determine whether a measured helium concentration has fallen below a predetermined minimum level.

If a positive determination is made in step 510, the method continues to step 512 where helium is added to the STW 200 through the port 320. The method then returns to step 508 where the respective sensor (330 or 400) is again monitored and the determination of the helium level is again made in step 510. If a negative determination is made at step 510 (i.e., there is no indication of a helium leak or an earlier detected leak has been addressed by the prior addition of helium in step 512), the method continues to step 514 where a determination is made as to whether the servo writing process is complete. If a negative determination is made in step 514 (i.e., if the servo writing process is not yet complete), the method returns to step 508 and the process of monitoring the helium level within the STW 200 continues. On the other hand, if a positive determination is made at step 514 (i.e., the servo patterns have been completely written to the discs 108 of the drive 100), the method continues to step 516 where the door 306 is opened and the drive 100 is removed from the STW 200. The method then terminates at step 518, and the entire process repeats itself with a new disc drive 100 at step 500.

The above description of the STW 200 and the cover 300, as well as the method described in FIG. 5, applies primarily to a servo track writer that works in conjunction with a pre-assembled disc drive 100 which utilizes the actuator assembly 110 and the heads 118 of the disc drive 100 to write servo patterns to discs 108 already installed within the drive. However, the present invention may also be used with dedicated servo track writers that write servo patterns to a plurality of discs prior to those discs being assembled within a disc drive. This type of servo track writer 600 is shown in FIG. 6 and is referred to hereafter as a multi-disc writer ("MDW") to differentiate it from the more conventional STW 200 shown in FIG. 2.

The MDW 600 sits upon a substantially immobile and horizontally positioned platform or granite slab 602. An actuator assembly 604 is connected to the platform 602 via a slide mechanism 606 for lateral movement (as indicated by arrow 608) over the platform 602 between a servo writing position (not shown) and a disc loading and unloading position as shown in FIG. 6. The actuator assembly 604 includes an E-block 612 having a plurality of actuator arms 614 for positioning a plurality of servo recording heads (not separately shown in FIG. 6) to write servo patterns onto a plurality of target discs 620. The discs 620 are preferably secured to a spindle motor hub assembly 622 in a vertical orientation and are loaded as a stack 624 on a removable spindle hub 626 so that the hub 626 and the stack of discs 620 can be detached from a spindle motor 628 to ease the process of loading and unloading the discs 620 from the spindle motor hub assembly 622.

Once the discs 620 have been loaded on the spindle motor hub assembly 622, the actuator assembly 604 is preferably moved laterally along the platform 602 (in the direction of arrow 608) toward the spindle motor hub assembly 622. A comb (not shown in FIG. 6) is preferably used to maintain proper separation between the heads at the ends of the actuator arms 614 so that the actuator assembly 604 and the disc stack 624 on the spindle motor hub assembly 622 may merge without unintentional contact between the heads and the discs 620. Once the actuator assembly 604 is locked into the servo writing position so that the heads are positioned within the gaps between adjacent discs 620, the comb (not shown) is rotated away from the E-block 612 to allow the heads to engage their respective discs as a result of the bias force provided by flexures at the ends of each actuator arm 614. Of course, the servo writing heads do not make physical contact with the respective disc surfaces since the spindle motor 628 is activated to spin the discs 620 at a predetermined rate prior to disengaging the comb.

Figure 6:
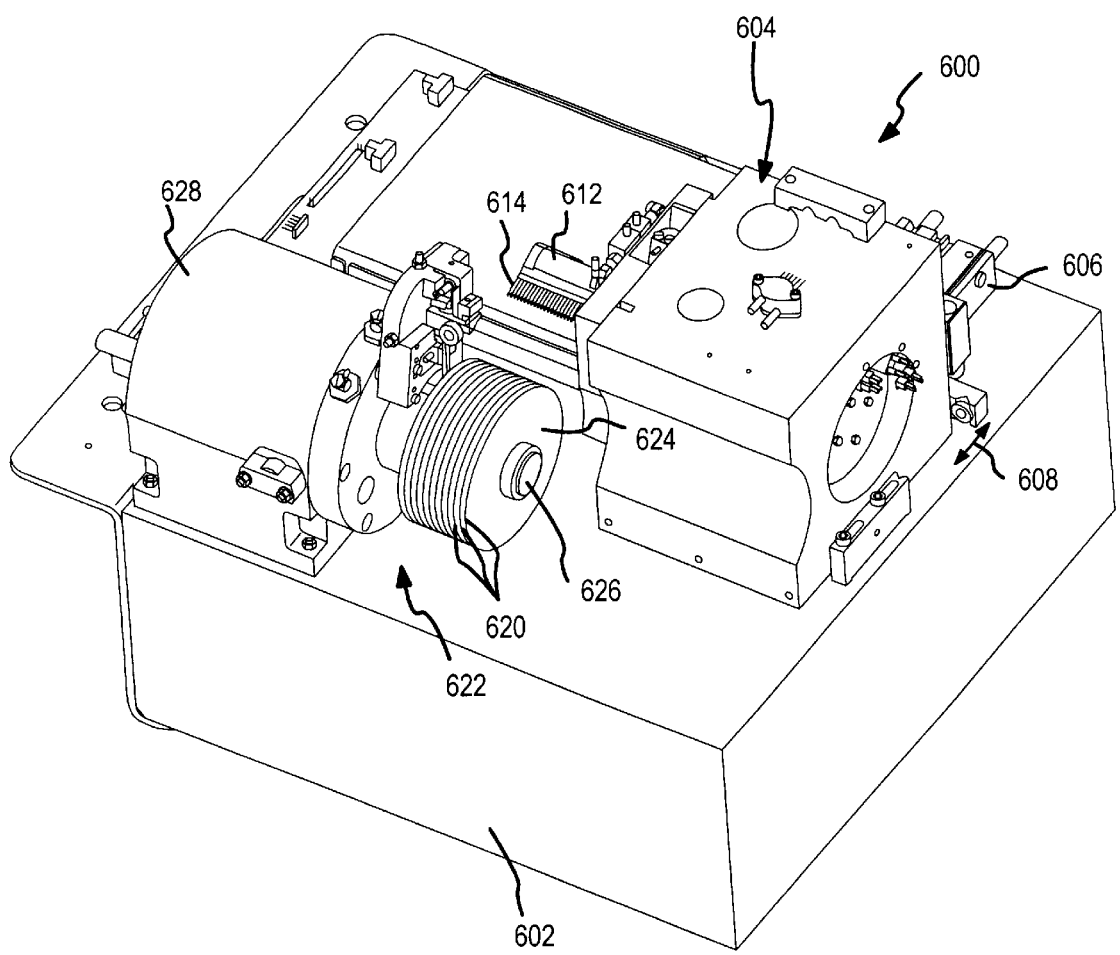
FIG. 6 is a perspective view of a dedicated STW in accordance with a preferred embodiment of the present invention for writing servo information to a plurality of discs prior to assembly within a disc drive, referred to herein as a multi-disc writer ("MDW").
Figure 7:
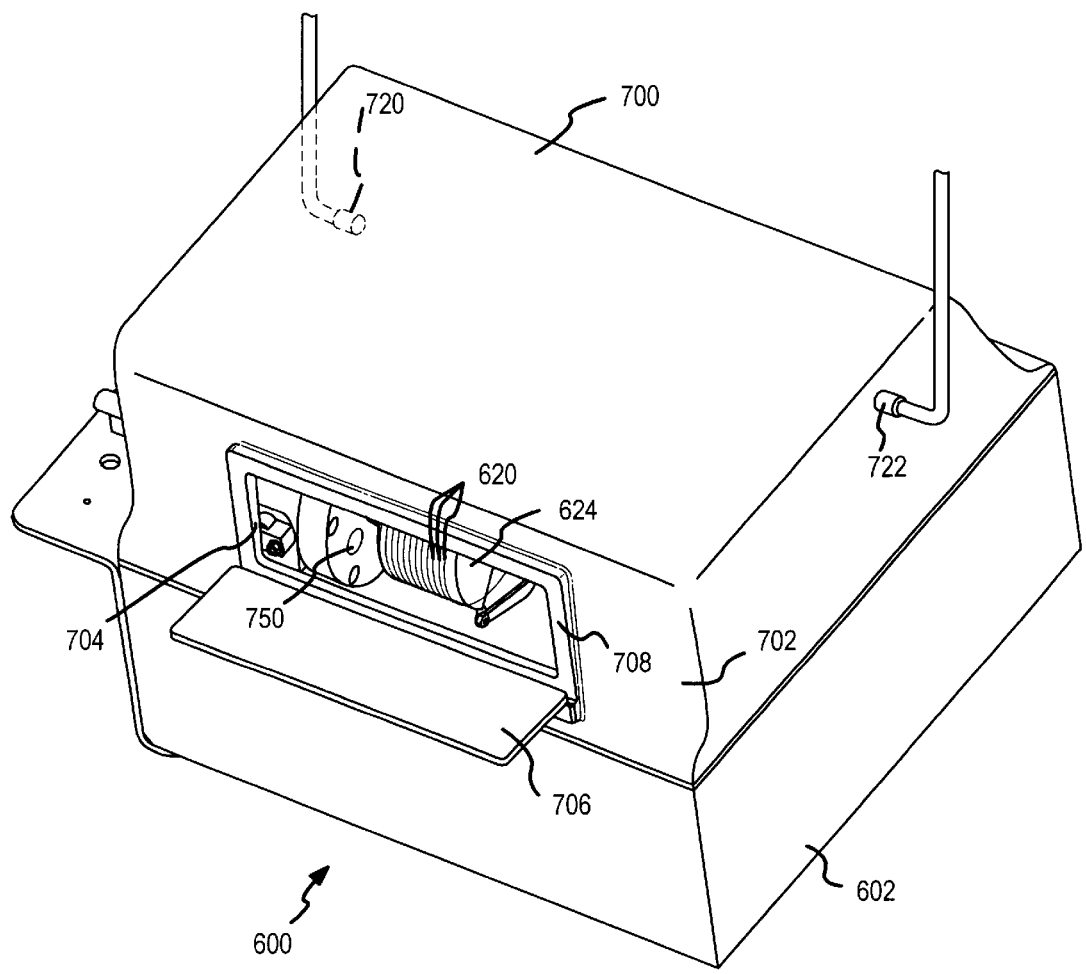
FIG. 7 is a perspective view of the MDW of FIG. 6 illustrating a cover for creating a sealed environment within the MDW as well as an inflow line for filling the MDW with a low-density gas, an outflow line for recovering the low-density gas, and a sensor for detecting gas leakage from the MDW during the servo writing process.

In previous versions of the MDW 600 shown in FIG. 6, the heads "fly" on an air bearing a predetermined distance over the surface of the discs. However, as with the STW 200 shown in FIG. 2, the MDW 600 also suffers from drag-induced vibrations due to aerodynamic drag forces experienced by the plurality of discs 620 rotating at a predetermined high speed within the MDW 600. Thus, the MDW 600 of the present invention includes a cover 700 (FIG. 7) extending over the entirety of the platform 602 to provide for a helium environment as described above with respect to the STW 200. The cover 700 is similar to the cover 300 shown in FIG. 3 and includes a front face 702 defining an opening 704 for receiving the disc drive stack 624 on the detachable spindle hub 626. A door 706 is preferably hinged along a bottom edge so that the door 706 may be closed to seal the disc stack 624 within the covered MDW 600. In one preferred embodiment, a motor (not shown) can be used to automatically open and close the door 706 so that the door can be used in conjunction with robotic means for automatically loading and retrieving the disc stack 624 from the covered MDW 600. A seal 708 around the periphery of the opening 704 acts in conjunction with the door 706 to form a substantially sealed interior environment within the covered MDW 600 when the door 706 is closed.

The cover 700 includes an inflow port 720 and an outflow port 722 similar to those found on the STW cover 300 shown in FIGS. 3 and 4. The outflow port 722 is preferably connected to a helium recovery system (not shown), while the inflow port 720 is preferably connected to a source (not shown) of pure helium that satisfies the class 10 clean room requirements described above. While the MDW 600 operates in a different manner than the STW 200 described above (due primarily to the use of a dedicated actuator assembly 604 and a dedicated spindle motor hub assembly 622, the leak detection method of the present invention operates in substantially the same manner as described above with respect to FIG. 5. Initially, the door 706 is opened to allow the disc stack 624 to be inserted within the interior of the MDW 600. The MDW is then filled with helium (or another low-density gas) through the inflow port 720. Next the spindle motor 628 is activated to spin the discs 620 and the actuator assembly 604 is moved into position so that the heads (not shown) fly above the respective disc surfaces. The heads are then activated to begin writing servo patterns to the discs.

During the servo writing process, a sensor 750 (FIG. 7) is continuously polled to determine either the actual concentration of helium within the MDW 600 (in the case that the sensor 750 is a pressure sensor) or to detect the amplitude of certain drag-induced vibrations caused by the rotating discs 620 (disc modes). In the embodiment shown in FIG. 7, the sensor 750 is preferably an accelerometer that is attached to a flange of the spindle motor 628 adjacent the disc stack 624. The proximity of the accelerometer 750 to the rotating discs ensures that the disc mode vibrations will be accurately detected by the accelerometer 750. Alternatively, the sensor 750 may represent one of the sensors described above, including a pressure sensor, a LDV, a capacitance probe, or position feedback circuitry used within the MDW 600 to determine the position of the dedicated servo heads. Such sensors provide an indirect measurement of the vibrations within the MDW 600 and thus of the concentration of helium or other low-density gas.

As described above with respect to FIG. 5, the signals generated by the sensor 750 are continuously monitored in order to determine the presence of a helium leak. Once a leak is detected, the method continues to add helium to the MDW through the inflow port 720. This continuous monitoring and filling of the MDW 600 continues until the servo writing cycle is complete and the disc stack 624 is removed from the MDW 600 through the open door 706. While a vertically-oriented MDW 600 is illustrated, it is understood that the precise design of the MDW is not crucial to the present invention and that any other MDW (including a horizontally-oriented MDW may be used with the cover 700 and sensor 750 of the present invention.

Described in another way, a method in accordance with an exemplary preferred embodiment of the present invention detects leaks of a low-density gas from an enclosure (such as 200 and 600) that contains a rotating storage disc (such as 108 and 620). The method includes the step of monitoring a signal which varies in response to variations in the concentration of the low-density gas in the enclosure (such as in operation 508) and adding additional quantities of the low-density gas to the enclosure when the monitored signal indicates that the concentration of the low-density gas has dropped below a predetermined level (such as in operation 512). In one embodiment, the low-density gas comprises helium.

In one embodiment, the signal comprises actual concentration levels of the low-density gas derived from a pressure sensor (such as 330) located within the enclosure. Alternatively, the signal may be generated by an accelerometer (such as 400) used to monitor disc mode vibration amplitudes that vary with the concentration of the low-density gas in the enclosure. In a further alternative, the sensor (such as 330) measures a value indirectly related to amplitudes of the vibrations generated by the rotating storage disc. The sensor (such as 330) is preferably selected from a group consisting of a laser Doppler vibrometer, a capacitance probe, and a servo head position feedback circuit.

Another embodiment of the present invention may be described as a servo writing assembly for writing servo patterns on a disc (such as 108 and 620) in a low-density gas environment. The assembly includes a servo track writer ("STW") (such as 200 and 600) having a base (such as 202 and 602) adapted to support a spindle motor (such as 106 and 628) for rotating the disc (such as 108 and 620) and a servo writing head (such as 118) for writing servo patterns on the rotating disc. A cover (such as 300 and 700) attached to the base (such as 202 and 602) forms an enclosed interior environment within the STW (such as 200 and 600). The cover (such as 300 and 700) includes a sealable opening (such as 304 and 704) for loading the disc within the STW.

The cover further includes an inflow port (such as 320 and 720) for directing the low-density gas into the interior environment of the STW (such as 200 and 600) prior to writing servo patterns on the disc (such as 108 and 620). The assembly further includes a sensor (such as 330, 400 and 750) for detecting when a concentration of the low-density gas within the STW (such as 200 and 600) drops below a predetermined minimum level so that additional quantities of the low-density gas can be added to the STW until the concentration of the low-density gas exceeds the predetermined minimum level.

In one embodiment of the servo writing assembly, the sensor is an accelerometer (such as 400 and 750) attached to the spindle motor (such as 106 and 628). In an alternative embodiment, the sensor (such as 330, 400 and 750) measures a value indirectly related to amplitudes of the vibrations generated by the rotating storage disc. In that embodiment, the sensor (such as 330, 400 and 750) is preferably selected from a group consisting of a laser Doppler vibrometer, a capacitance probe, and a servo head position feedback circuit. Additionally, where the disc (such as 108), the spindle motor (such as 106) and the servo writing head (such as 118) are all preinstalled within a disc drive (such as 100), the disc drive (such as 100) is inserted through the opening (such as 304) in the cover (such as 300) and fixed within the interior environment of the STW (such as 200). Alternatively, where the STW is a MDW (such as 600) having a dedicated spindle motor (such as 628) and a plurality of dedicated servo writing heads, the dedicated spindle motor (such as 628) supports a plurality of discs (such as 620) in a disc stack (such as 624) for simultaneous servo pattern writing to each disc.

Yet another embodiment of the present invention may be described as a servo writing assembly having an enclosure (such as 200 and 600) supporting a rotating storage disc (such as 108 and 620) in an interior volume filled with a low-density gas. The servo writing assembly includes means (such as 330, 400 and 750) for detecting when a concentration of the low-density gas within the enclosure (such as 200 and 600) has dropped below a predetermined minimum level. In one embodiment, the means for detecting low concentrations of the low-density gas includes means (such as 330 and 750) for indirectly detecting a magnitude of drag-induced vibrations that grow in intensity as the low-density gas leaks from the enclosure (such as 200 and 600) and is replaced by air.

It will be clear that the present invention is well adapted to attain the ends and advantages mentioned as well as those inherent therein. While embodiments have been described for purposes of this disclosure, various changes and modifications may be made which are well within the scope of the present invention. For example, while the low-density gas preferably comprises helium, alternative low-density gases may be used provided such gases are purified for use within a clean room environment. Additionally, while specific embodiments of the disc drive 100, the STW 200 and the MDW 600 have been described, the present invention is not limited to any specific disc drive or servo writer design. Rather, the invention may be employed with any servo writer or other enclosure that holds a rotating disc provided that the enclosure can be covered to allow an interior to be filled with a low-density gas. Furthermore, one skilled in the art may use alternative means for detecting increases in turbulence (i.e., friction between the discs and the atmosphere) within the STW in order to detect helium leaks during the servo writing process. For example, the current required to drive the spindle motor (106 and 628) will necessarily rise as helium leaks from the STW to compensate for the greater drag force applied to the discs (108 and 620) by the air that replaces the leaked helium. Thus, a sensor measuring spindle motor current may be used in place of the above-described sensors 330, 400 and 750. Thus, the present invention is not limited to any single leak detection technique. Numerous other changes may be made which will readily suggest themselves to those skilled in the art. Accordingly, all such modifications, changes and alternatives are encompassed in the scope of the invention disclosed and as defined in the appended claims.

What is claimed is:

1. A method of detecting leaks of a low-density gas from an enclosure containing a rotating storage disc comprising steps of:
   (a) monitoring a signal that can vary responsive to variations in the concentration of the low-density gas in the enclosure; and
   (b) adding low-density gas to the enclosure when the monitored signal indicates that the concentration of the low-density gas has dropped below a predetermined level.

2. The method of claim 1, wherein the signal comprises actual concentration levels of the low-density gas derived from a pressure sensor located within the enclosure.

3. The method of claim 1, wherein the rotating storage disc generates vibrations that vary with the concentration of the low-density gas in the enclosure, and wherein the signal is generated by an accelerometer attached within the enclosure.

4. The method of claim 3, wherein the enclosure is a servo track writer ("STW") having a cover to substantially contain the low-density gas, and the accelerometer is attached to a spindle motor of a disc drive positioned within the STW.

5. The method of claim 1, wherein the enclosure is a servo track writer ("STW") having a cover to substantially contain the low-density gas, and the rotating storage disc generates vibrations that vary with the concentration of the low-density gas within the STW, and wherein the signal measures a value indirectly related to amplitudes of the vibrations generated by the rotating storage disc, the signal generated by a sensor within the STW selected from a group consisting of a laser Doppler vibrometer, a capacitance probe, and a servo head position feedback circuit.

6. The method of claim 5, wherein the monitoring step (a) further comprises calculating actual vibration amplitude values by applying a fast Fourier transform algorithm to the signal and comparing the calculated value to a predetermined maximum vibration amplitude.

7. The method of claim 5, wherein the monitoring step (a) further comprises calculating a root mean square value of the signal and comparing the calculated value to a predetermined maximum average value.

8. The method of claim 1, wherein the enclosure is a multi-disc writer ("MDW") having a cover to substantially contain the low-density gas and further having a dedicated spindle motor and a plurality of dedicated servo writing heads for writing servo information to a plurality of rotating storage discs, and wherein the plurality of rotating storage discs generate vibrations that vary with the concentration of the low-density gas in the MDW.

9. The method of claim 8, wherein the signal comprises actual concentration levels of the low-density gas derived from a pressure sensor located within the MDW.

10. The method of claim 8, wherein the signal is generated by an accelerometer attached within the MDW.

11. The method of claim 8, wherein the signal measures a value indirectly related to amplitudes of the vibrations generated by the rotating storage discs, the signal generated by a sensor within the MDW selected from a group consisting of a laser Doppler vibrometer, a capacitance probe, and a servo head position feedback circuit.

12. The method of claim 1, wherein the adding step (b) farther comprises initiating a flow of the low-density gas into the enclosure and continuing the flow until the monitored signal indicates that the concentration of the low-density gas exceeds the predetermined level, and then discontinuing the flow of the low-density gas.

13. The method of claim 1, wherein a continuous flow of the low-density gas to the enclosure is maintained at a predetermined flow rate, and wherein the adding step (b) further comprises increasing the flow rate of the low-density gas beyond the predetermined flow rate until the concentration of the low-density gas exceeds the predetermined level, and then returning the flow rate of the low-density gas to the predetermined flow rate.

14. A servo writing assembly for writing servo patterns on a disc in a low-density gas environment comprising:
   a servo track writer ("STW") having a base adapted to support a spindle motor for rotating the disc and a servo writing head for writing servo patterns on the rotating disc;
   a, cover cooperating with the base to form an enclosed interior environment within the STW, wherein the cover includes a sealable opening for loading the disc within the STW and an inflow port for directing the low-density gas into the interior environment of the STW prior to writing servo patterns on the disc; and
   a sensor for detecting when a concentration of the low-density gas within the STW drops below a predetermined minimum level so that additional quantities of the low-density gas can be added to the STW until the concentration of the low-density gas exceeds the predetermined minimum level.

15. The servo writing assembly of claim 14 wherein the rotating disc generates vibrations that vary with the concentration of the low-density gas within the STW, and wherein the sensor is an accelerometer attached to the spindle motor.

16. The servo writing assembly of claim 14 wherein the rotating disc generates vibrations that vary with the concentration of the low-density gas within the STW, and wherein the sensor measures a value that is indirectly related to amplitudes of the vibrations generated by the rotating storage disc, the sensor selected from a group consisting of a laser Doppler vibrometer, a capacitance probe, and a servo head position feedback circuit.

17. The servo writing assembly of claim 16 wherein the disc, the spindle motor and the servo writing head are all preinstalled within a disc drive, and wherein the disc drive is inserted through the opening in the cover and fixed within the interior environment of the STW.

18. The servo writing assembly of claim 16 wherein the STW is a multi-disc writer having a dedicated spindle motor and a plurality of dedicated servo writing heads, and wherein the dedicated spindle motor supports a plurality of discs in a disc stack for simultaneous servo pattern writing to each disc.

19. A servo writing assembly comprising:
   an enclosure supporting a rotating storage disc in an interior volume filled with a low-density gas; and
   means for detecting when a concentration of the low-density gas within the enclosure has dropped below a predetermined minimum level.

20. The servo writing assembly of claim 19 wherein the means for detecting low concentration levels of the low-density gas includes means for indirectly detecting a magnitude of drag-induced vibrations generated by the rotating disc, wherein the drag-induced vibrations grow in intensity as the low-density gas leaks from the STW and is replaced by air.

* * * * *